US009302697B2

(12) United States Patent
Ohashi

(10) Patent No.: US 9,302,697 B2
(45) Date of Patent: Apr. 5, 2016

(54) STEERING APPARATUS

(71) Applicant: JTEKT CORPORATION, Osaka-shi, Osaka (JP)

(72) Inventor: Tatsuya Ohashi, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/550,056

(22) Filed: Nov. 21, 2014

(65) Prior Publication Data
US 2015/0151787 A1 Jun. 4, 2015

(30) Foreign Application Priority Data

Dec. 3, 2013 (JP) .................................. 2013-250447
May 9, 2014 (JP) .................................. 2014-097839

(51) Int. Cl.
*B62D 3/12* (2006.01)
*B62D 7/16* (2006.01)

(52) U.S. Cl.
CPC . *B62D 3/12* (2013.01); *B62D 7/163* (2013.01)

(58) Field of Classification Search
CPC ................................. B62D 3/12; B62D 7/163
USPC ........................................ 74/422; 280/93.514
See application file for complete search history.

(56) References Cited

U.S. PATENT DOCUMENTS

| 3,593,932 A | 7/1971 | Altice et al. | |
|---|---|---|---|
| 7,258,035 B2 | 8/2007 | Bieber | |
| 8,662,509 B2 * | 3/2014 | Shiraishi ................. | B62D 3/12 |
| | | | 180/444 |
| 8,925,939 B2 * | 1/2015 | Ohashi ..................... | B62D 3/12 |
| | | | 280/93.514 |
| 9,156,493 B1 * | 10/2015 | Kimijima ............... | B62D 3/126 |
| 2006/0131828 A1 | 6/2006 | Tanaka | |
| 2012/0242054 A1 | 9/2012 | Shiraishi et al. | |
| 2014/0137692 A1 | 5/2014 | Ohashi | |
| 2014/0137693 A1 | 5/2014 | Ohashi | |

FOREIGN PATENT DOCUMENTS

| DE | 10 2009 019890 A1 | 11/2010 |
|---|---|---|
| DE | 10 2011 051 715 A1 | 1/2013 |
| EP | 1 500 573 A1 | 1/2005 |
| EP | 1 777 138 A1 | 4/2007 |
| GB | 2 308 617 A | 7/1997 |
| JP | B2-4696483 | 6/2011 |
| WO | 2009/094972 A1 | 8/2009 |

OTHER PUBLICATIONS

Mar. 30, 2015 Extended Search Report issued in European Patent Application No. 14195909.8.

* cited by examiner

*Primary Examiner* — Ruth Ilan
(74) *Attorney, Agent, or Firm* — Oliff PLC

(57) ABSTRACT

A steering apparatus configured to inhibit a driver from feeling uncomfortable when an end bush impact occurs is provided. The steering apparatus includes a rack shaft that makes a linear motion in a rack housing in response to rotation of a steering shaft, and a ball joint fitted to an end portion of the rack shaft. The steering apparatus further includes an elastic body disposed between the rack housing and the ball joint, an end plate, and a projection of the rack housing. When the elastic body is compressively deformed due to collision of the ball joint with the elastic body, the end plate comes into contact with the projection to restrict compressive deformation of the elastic body by an amount exceeding a length. The length is set larger than a length of a compression deformation length with respect to an axial force due to a reverse input.

10 Claims, 7 Drawing Sheets

STEERING APPARATUS

INCORPORATION BY REFERENCE

The disclosure of Japanese Patent Applications No. 2013-250447 filed on Dec. 3, 2013 and No. 2014-097839 filed on May 9, 2014, each including the specification, drawings and abstract, is incorporated herein by reference in its entirety.

BACKGROUND OF THE INVENTION

1. Field of the Invention

The invention relates to a steering apparatus.

2. Description of the Related Art

A conventional steering apparatus that transmits the rotation of a steering shaft caused in response to an operation of a steering wheel to a steering mechanism, thereby changing the orientation of steered wheels is described, for example, in Japanese Patent No. 4696483. In the steering apparatus described in Japanese Patent No. 4696483, a rack-and-pinion mechanism is used as the steering mechanism. The rack-and-pinion mechanism changes the orientation of the steered wheels by converting the rotation of the steering shaft into a linear motion of a rack shaft that meshes with the steering shaft. The rack shaft is slidably housed in a housing. Usually, when the rack shaft reaches the limit of its moving range, an end (a rack end) of the rack shaft collides with the housing, that is, an end bush impact occurs. In this way, the moving range of the rack shaft is physically restricted.

Such an end bush impact may occur not only by an input (normal input) caused as a driver operates the steering wheel, but also by an input (reverse input) caused, for example, as the steered wheel runs onto a curb. Usually, such a reverse input produces an impact that is larger than that produced by the driver's operation of the steering wheel. In view of this, in Japanese Patent No. 4696483, an elastic body is disposed between the housing and the rack end in order to absorb large inputs such as the reverse input.

However, in the steering apparatus according to Japanese Patent No. 4696483, when an end bush impact occurs due to the driver's operation of the steering wheel, the rack end collides with the housing via the elastic body. This makes it difficult to determine a steering angle at which the rack end collides with the housing. As a result, some drivers feel uncomfortable in holding the steering wheel when an end bush impact occurs.

SUMMARY OF THE INVENTION

One object of the invention is to provide a steering apparatus configured to inhibit a driver from feeling uncomfortable when an end bush impact occurs due to a driver's operation of a steering wheel.

A steering apparatus according to an aspect of the invention includes: a steered shaft that changes an orientation of steered wheels by making a linear motion in a housing in response to rotation of a steering shaft;

an end member that is fitted to an end portion of the steered shaft, and that comes into contact with or moves away from the housing in response to movement of the steered shaft;

an elastic body disposed between the housing and the end member; and a restricting portion that restricts compressive deformation of the elastic body beyond a limit of a prescribed range, when the elastic body is compressively deformed in a direction of the linear motion of the steered shaft due to collision of the end member with the elastic body.

The restricting portion restricts the compressive deformation beyond the limit of the prescribed range when a first input is applied to the steered shaft.

The prescribed range is set larger than a range in which the elastic body is compressively deformed when a second input that is shorter in duration than the first input is applied to the steered shaft.

According to the above aspect, when the first input is applied to the steered shaft, the compressive deformation of the elastic body beyond the limit of the prescribed range is restricted. On the other hand, when the second input is applied to the steered shaft, even if the elastic body is compressively deformed, the compressive deformation does not reach the limit of the prescribed range. For example, a normal input, which is an input due to a driver's operation of a steering wheel, is assumed to the first input. For example, a reverse input, which is an input caused, for example, as the steered wheel runs onto a curb, is assumed to be the second input. Thus, in the case where an end bush impact occurs due to a normal input and thus the duration of the end bush impact is long, the compressive deformation of the elastic body is restricted by the restricting portion. Thus, at the time of the end bush impact caused by normal input, the amount of compressive deformation of the elastic body reaches the limit of the prescribed range and further compressive deformation is restricted. Therefore, if the driver continues to apply force to maintain the end bush impact in the above-described state, a wobble of the steering wheel is restricted. As a result, it is possible to inhibit the driver from feeling uncomfortable at the time of the end bush impact due to the normal input.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
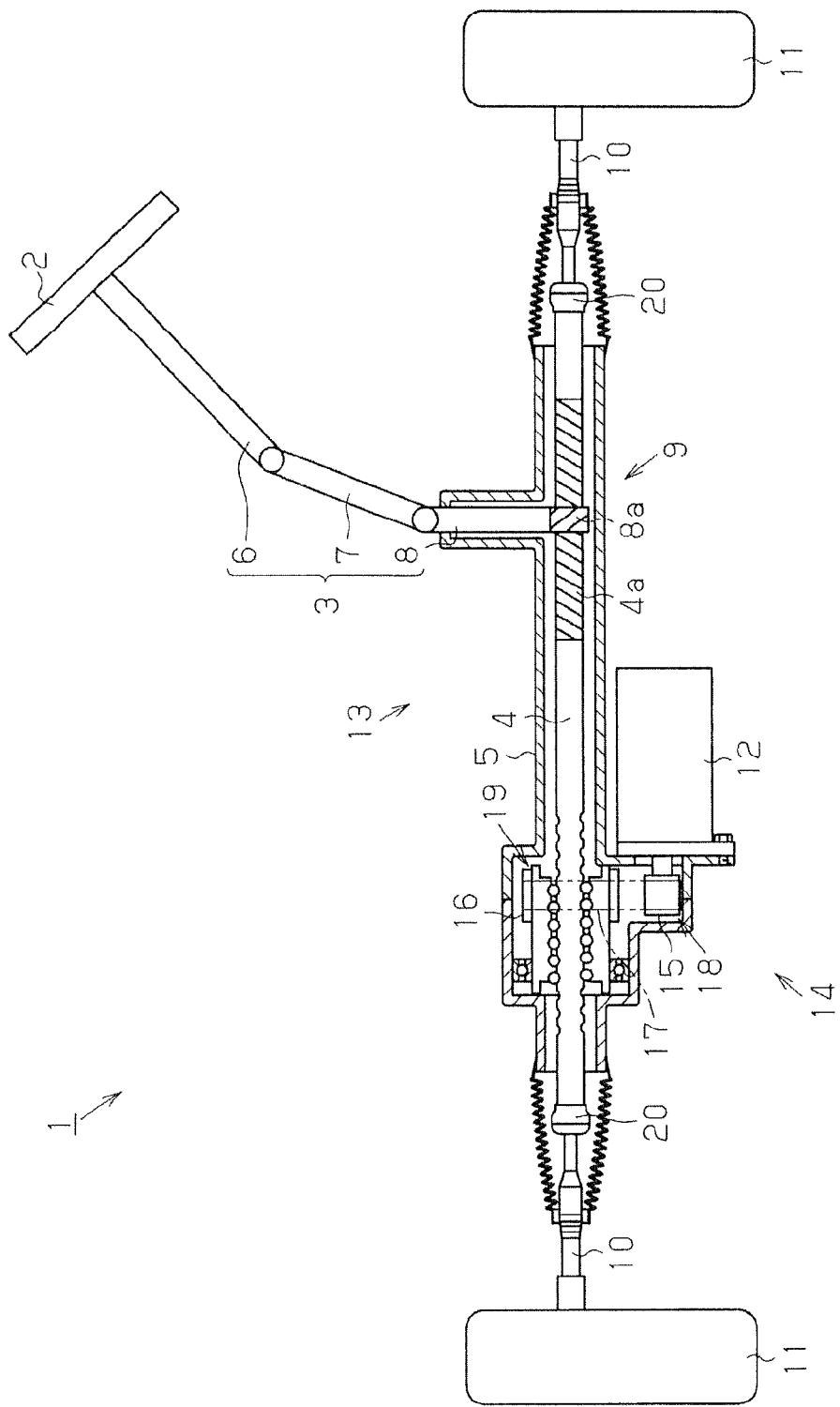
FIG. 1 is a view illustrating the schematic configuration of a steering apparatus.

Hereinafter, a steering apparatus according to a first embodiment of the invention will be described. As illustrated in FIG. 1, a steering apparatus 1 includes a steering wheel 2 operated by a driver, and a steering shaft 3 to which the steering wheel 2 is fixed. The steering apparatus 1 further includes a rack shaft 4, which is a steered shaft that makes a reciprocating motion in response to the rotation of the steering shaft 3, and a rack housing 5, which is a generally cylindrical housing through which the rack shaft 4 is passed so as to be able to make a reciprocating motion. The rack shaft makes a linear motion in its axial direction. The steering shaft 3 is formed by coupling a column shaft 6, an intermediate shaft 7, and a pinion shaft 8 that are arranged in the stated order from the steering wheel 2 side.

The rack shaft 4 and the pinion shaft 8 are disposed in the rack housing 5 with a prescribed crossing angle formed therebetween, and rack teeth 4a formed on the rack shaft 4 and pinion teeth 8a formed on the pinion shaft 8 are meshed with each other, whereby a rack-and-pinion mechanism 9 is provided. Tie rods 10 are pivotably coupled to the opposite ends of the rack shaft 4 via ball joints 20. Steered wheels 11 are coupled to the distal ends of the tie rods 10.

In the steering apparatus 1 having the above-described configuration, the rotation of the steering shaft 3 caused in response to the driver's steering operation is converted into an axial motion of the rack shaft 4 by the rack-and-pinion mechanism 9. The thus obtained axial motion is transmitted to the tie rods 10 via the ball joints 20 coupled to the opposite ends of the rack shaft 4, whereby the tie rods 10 are driven. As the tie rods 10 are driven, the steered angle of the steered wheels 11 is changed and thus the travelling direction of a vehicle is changed.

The steering apparatus 1 further includes a steering force assist device 14 that applies assisting force to a steering mechanism 13 including the steering wheel 2, the steering shaft 3, and the rack shaft 4, by using a motor 12 disposed parallel to the rack shaft 4 as a drive source. The steering force assist device 14 includes a transmitting mechanism 18 including: a drive pulley 15 coupled to the motor 12; a driven pulley 16 disposed parallel to the drive pulley 15 and coupled to the rack shaft 4; and a toothed belt 17 that couples the pulleys 15, 16 to each other. The belt 17 is a toothed belt. A ball screw mechanism 19 is interposed between the rack shaft 4 and the driven pulley 16. The rotation generated by the motor 12 is transmitted to the rack shaft 4 via the transmitting mechanism 18.

In the steering force assist device 14, the rotation generated by the motor 12 is transmitted to the ball screw mechanism 19 via the transmitting mechanism 18, and is converted into a reciprocating motion of the rack shaft 4 via the ball screw mechanism 19, whereby the assisting force is applied to the steering mechanism 13. That is, the steering apparatus 1 according to the present embodiment functions as a so-called rack parallel-type electric power steering apparatus.

Figure 2:
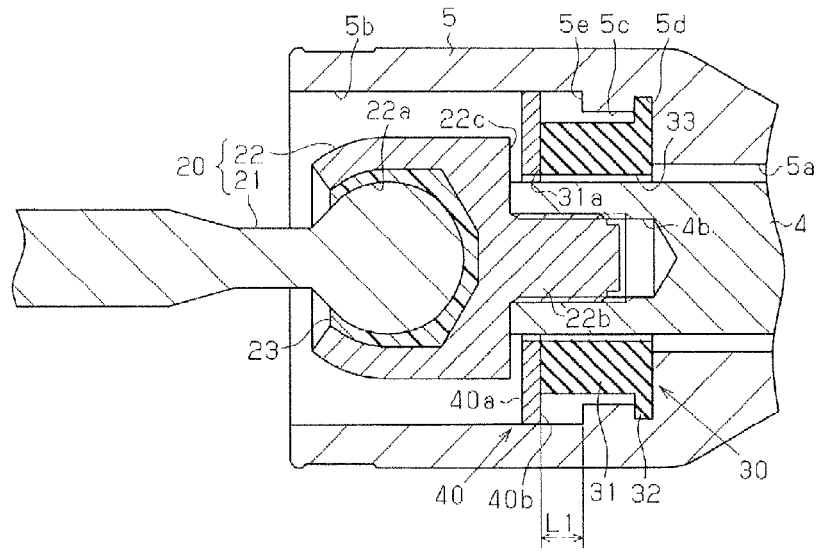
FIG. 2 is a view illustrating the schematic configuration of a shaft end portion of a rack shaft according to a first embodiment.

Next, the configuration of a shaft end portion of the rack shaft 4 will be described. As illustrated in FIG. 2, the rack housing 5 has a rack housing portion 5a that houses the rack shaft 4, and a joint housing portion 5b that is opened in the axial direction, which coincides with the direction of a reciprocating motion, and that houses the rack shaft 4 and the ball joint 20. A projection 5c is formed between the housing portions 5a, 5b so as to project radially inward from the inner periphery of the rack housing 5. A groove 5d is formed next to the projection 5c, and the inside diameter of the groove 5d is larger than that of the projection 5c. A contact face 5e is formed on an end face of the projection 5c, which is located on the opposite side of the projection 5c from the groove 5d. The contact face 5e is located between the projection 5c and the joint housing portion 5b, and is formed due to the difference between the inside diameter of the projection 5c and the inside diameter of the joint housing portion 5b.

A mount portion 4b in which the ball joint 20 is mounted is formed in the shaft end portion of the rack shaft 4. The mount portion 4b is opened in the axial direction of the rack shaft 4.

Next, the ball joint 20 will be described. The ball joint 20 includes a ball stud 21 having a distal end portion formed in a ball shape, and a socket 22 having a housing portion 22a in which the distal end portion of the ball stud 21 is pivotably housed. The ball stud 21 is housed in the socket 22 with a buffer material 23 interposed between the ball stud 21 and the socket 22. A screw portion 22b screwed to the mount portion 4b of the rack shaft 4 is formed at the opposite end side to the housing portion 22a of the socket 22. The screw portion 22b projects in the axial direction from the opposite end side to the housing portion 22a. When the screw portion 22b is screwed to the mount portion 4b of the rack shaft 4, the socket 22 is fixed to the rack shaft 4. Consequently, the ball joint 20 is coupled to the rack shaft 4.

An end portion 22c with which the shaft end of the rack shaft 4, that is, the distal end of the rack shaft 4 comes into contact is formed at the base of the screw portion 22b of the socket 22. The end portion 22c extends in the radial direction from the base of the screw portion 22b. In the present embodiment, the end portion 22c comes into contact with the distal end of the rack shaft 4, and serves as a so-called rack end. That is, the ball joint 20 (socket 22) having the end portion 22c may function as an end member.

An elastic body 30 and an end plate 40 are disposed in the joint housing portion 5b. The elastic body 30 is made of a resin material such as rubber, and the end plate 40 is made of metal, such as iron, having a modulus of elasticity higher than that of the elastic body 30. The rack shaft 4 is passed through the elastic body 30 and the end plate 40.

The elastic body 30 has an annular shape, and includes a body portion 31 of which the outside diameter is maintained constant in the axial direction, and a fitting portion 32 in the form of a flange. The length of the body portion 31 in the axial direction is set such that the distance between a distal end 31a of the body portion 31 and the contact face 5e is a length L1 when the elastic body 30 has not undergone compressive deformation. The outside diameter of the body portion 31 is set so as to be smaller than the inside diameter of the projection 5c when the elastic body 30 has not undergone compressive deformation. The outside diameter of the fitting portion 32 is set such that the fitting portion 32 is allowed to be fitted in the groove 5*d*. When the fitting portion 32 is fitted in the groove 5*d*, the elastic body 30 is fixed to the rack housing 5.

The end plate 40 is formed in a disc shape, is fixedly fitted to the distal end 31*a* of the elastic body 30 with fixing means such as an adhesive agent. The end plate 40 is fitted to the distal end 31*a* so as to be movable together with the elastic body 30. The outside diameter of the end plate 40 is slightly smaller than the inside diameter of the joint housing portion 5*b*, but it is set larger than the inside diameter of the projection 5*c*. That is, the end plate 40 is formed such that, when the end plate 40 moves toward the rack housing portion 5*a*, the elastic body 30-side end face of the end plate 40 comes into contact with the contact face 5*e*.

A receiving portion 40*a* to be brought into contact with the end portion 22*c* of the ball joint 20 is formed on an end face of the end plate 40, which faces the end portion 22*c*. A contact portion 40*b* to be brought into contact with the contact face 5*e* of the rack housing 5 is formed on an end face of the end plate 40, which is located on the opposite side of the end plate 40 from the receiving portion 40*a*. The end plate 40 is disposed such that the distance between the contact portion 40*b* of the end plate 40 and the contact face 5*e* coincides with the length L1 based on the fact that the distance between the distal end 31*a* of the elastic body 30 and the contact face 5*e* is L1 when the elastic body 30 has not undergone compressive deformation.

In the steering apparatus 1, when the rack shaft 4 makes a reciprocating motion, the end portion 22*c* of the ball joint 20 collides with the end plate 40 and then the end plate 40 is pushed against the elastic body 30 in some cases. In this case, the elastic body 30 is compressively deformed in the axial direction by an axial force applied to the end plate 40 from the rack shaft 4. After that, in the steering apparatus 1, the kinetic energy of the rack shaft 4 and the ball joint 20 is absorbed by the compressive deformation of the elastic body 30, and the rack shaft 4 stops moving. That is, an assembly formed by assembling together the end plate 40 and the elastic body 30 may be referred to as an impact absorbing member or an impact input absorbing member. The state where the contact portion 40*b* of the end plate 40 comes into contact with the contact face 5*e* of the rack housing 5 as a result of development of deformation is the state where an end bush impact occurs.

The end bush impact may occur in the following two cases, that is, a case where an axial force is applied from the rack shaft 4 to the end plate 40 due to a first input (hereinafter, referred to as "normal input") applied in response to the driver's steering operation, and a case where an axial force is applied from the rack shaft 4 to the end plate 40 due to a second input (hereinafter, referred to as "reverse input") applied, for example, as the steered wheel 11 runs onto a curb.

The normal input and the reverse input, which are assumed to be the first input and the second input, respectively, in the present embodiment are distinguished from each other based on a duration t of a load (pulse), from the standpoint of material testing study. That is, the normal input assumed to be the first input in the present embodiment is a load classified into static loading based on the duration t. A static loading is expressed as, for example, $10^4$ sec<t. On the other hand, the reverse input assumed to be the second input in the present embodiment is a load classified into impact loading based on the duration t. The impact loading is expressed as, for example, $10^{-6}$ sec<t<1 sec. In other words, in the present embodiment, the load duration of the second input (impact), that is, the reverse input is shorter than the load duration of the first input (impact), that is, the normal input classified into static loading.

Figure 3:
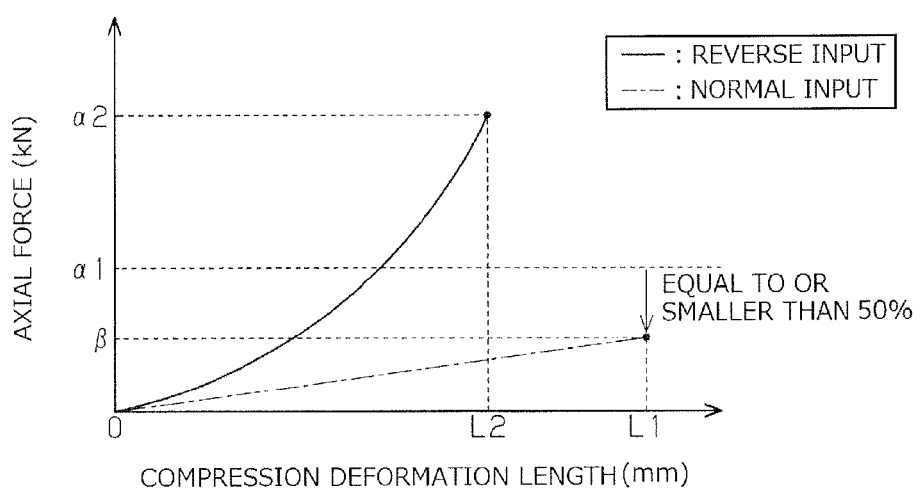
FIG. 3 is a graph illustrating the relationship between the axial force and the compression deformation length.

Next, description will be provided on an axial force that is applied from the rack shaft 4 to the elastic body 30 and a range of compressive deformation, that is, a compression deformation length in the axial direction in the present embodiment. FIG. 3 illustrates the relationship between the axial force applied to the elastic body 30 from the rack shaft 4 and the compression deformation length (mm). The relationship in the case of a normal input is indicated by an alternate long and short dash line, and that in the case of a reverse input is indicated by a continuous line. At the same axial force, the compression deformation length in the case of the normal input is larger than that in the case of the reverse input, that is, compressive deformation of the elastic body 30 in the case of the normal input is larger than that in the case of the reverse input.

In FIG. 3, an axial force $\alpha 1$ is the maximum axial force assumed to be generated by the normal input. The axial force $\alpha 1$ is derived based on, for example, an output and a speed reducing ratio of the motor 12 of the steering force assist device 14. An axial force $\alpha 2$ is the maximum axial force at which the vehicle is assumed to maintain a normal travelling state even after the reverse input is cancelled, among axial forces assumed to be generated by the reverse input. In the steering apparatus 1 according to the present embodiment, the axial force $\alpha 2$ is derived as the minimum axial force at which so-called jumping occurs, that is, meshing between the driven pulley 16 and the belt 17 is no longer maintained. Note that, meshing between the driven pulley 16 and the belt 17 may be the portion coupled to each other with the weakest force among the various portions coupled to each other through meshing of teeth in the steering apparatus 1.

As described above, the distance between the distal end 31*a* of the elastic body 30 and the contact face 5*e*, that is, the distance between the contact portion 40*b* of the end plate 40 and the contact face 5*e* is the limit value of the compression deformation length by which the elastic body 30 is compressively deformed in the axial direction due to the end bush impact. The limit value of the compression deformation length by which the elastic body 30 is compressively deformed is set to the length L1 that is larger than a length L2 of the compression deformation length with respect to the axial force $\alpha 2$ generated by the reverse input. In the present embodiment, the axial force at which the compression deformation length becomes the length L1 is denoted by a reference symbol $\beta$. The axial force $\beta$ is equal to or smaller than 50% of the maximum axial force $\alpha 1$ generated by the normal input. The length L1 is a length at which the elastic body 30 adopted in the present embodiment is able to absorb each input at a sufficient absorption rate when the elastic body 30 is compressively deformed. The length L1 is set such that an abnormally large normal input is not required for compressive deformation of the elastic body 30

More specifically, a range in which the elastic body 30 is compressively deformed is set such that, even when the elastic body 30 is compressively deformed due to the axial force $\alpha 2$ generated by the reverse input, the contact portion 40*b* of the end plate 40 does not come into contact with the contact face 5*e*, that is, does not come into contact with the rack housing 5. In addition, the range in which the elastic body 30 is compressively deformed is set such that, when an axial force equal to or larger than the axial force $\beta$ (and smaller than the axial force $\alpha 1$) is generated by the normal input and the elastic body 30 is compressively deformed due to the axial force, the contact portion 40*b* of the end plate 40 comes into contact with the contact face 5*e*, that is, comes into contact with the rack housing 5.

Figure 4A:
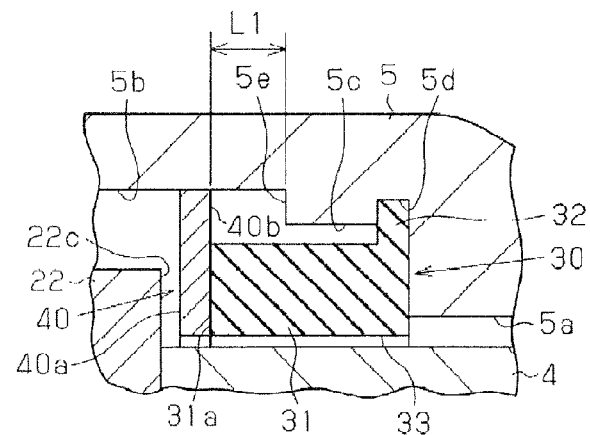
FIG. 4A is a view illustrating the shaft end portion of the rack shaft before occurrence of an end bush impact in the first embodiment.

Next, the shaft end portion of the rack shaft 4 at the time of an end bush impact due to a normal input or a reverse input will be described. Description will be provided mainly on the elastic body 30 and the end plate 40. As illustrated in FIG. 4A, before an end bush impact occurs, the end portion 22c of the socket 22 and the receiving portion 40a of the end plate 40 are apart from each other and the elastic body 30 has not undergone compressive deformation. That is, the contact portion 40b of the end plate 40 and the contact face 5e of the projection 5c of the rack housing 5 are apart from each other and the distance between the contact portion 40b and the contact face 5e is maintained at the length L1.

Figure 4B:
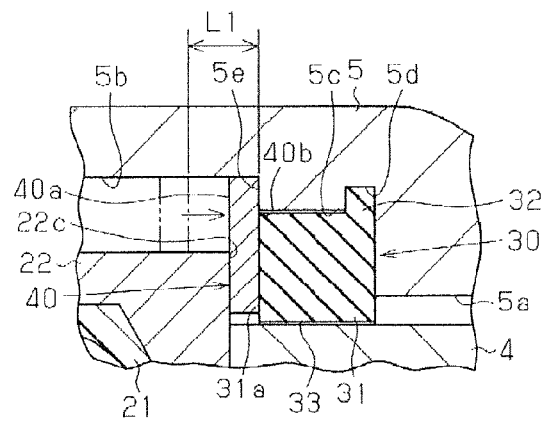
FIG. 4B is a view illustrating the shaft end portion of the rack shaft at the time of an end bush impact due to a normal input in the first embodiment.

Next, as illustrated in FIG. 4B, after the end portion 22c collides with the receiving portion 40a, the elastic body 30 is compressively deformed with an increase in the axial force due to a normal input. Then, when the axial force due to the normal input further increases and reaches the axial force β, an end bush impact occurs when the elastic body 30 is compressively deformed by an amount corresponding to the length L1. Because the elastic body 30 expands in the radial direction under the compressive axial force, the distance between the elastic body 30 and the projection 5c of the rack housing 5 is reduced.

At the time of the end bush impact, the end portion 22c and the receiving portion 40a come into contact with each other and the contact portion 40b of the end plate 40 and the contact face 5e of the projection 5c of the rack housing 5 come into contact with each other in the direction of a reciprocating motion of the rack shaft 4, whereby movement of the end plate 40 is restricted. Consequently, movement of the socket 22 and the rack shaft 4 is restricted by the contact face 5e. When the axial force due to the normal input is maintained equal to or larger than the axial force β, the end bush impact is maintained, that is, the state in which movement of the rack shaft 4 is restricted is maintained. In the present embodiment, the receiving portion 40a or the end plate 40 having the receiving portion 40a functions as a pressure receiving portion, and the contact face 5e or the projection 5c (rack housing 5) having the contact face 5e functions as a restricting portion.

Figure 4C:
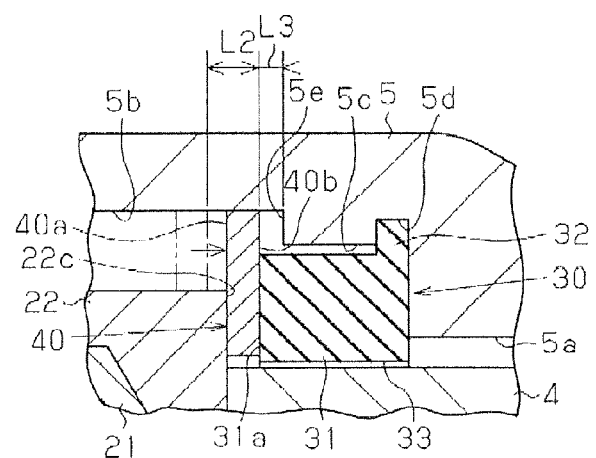
FIG. 4C is a view illustrating the shaft end portion of the rack shaft at the time of an end bush impact due to a reverse input in the first embodiment.

On the other hand, as illustrated in FIG. 4C, after the end portion 22c collides with the receiving portion 40a, the elastic body 30 is compressively deformed with an increase in the axial force due to a reverse input. Then, an end bush impact occurs as the elastic body 30 is compressively deformed within a range of the length L2 in accordance with the magnitude of the axial force due to the reverse input. Because the elastic body 30 expands in the radial direction under the compressive axial force, the distance between the elastic body 30 and the projection 5c of the rack housing 5 is reduced.

At the time of the end bush impact described above, the end portion 22c and the receiving portion 40a are in contact with each other and the contact portion 40b and the contact face 5e are apart from each other. Thus, movement of the socket 22 and the rack shaft 4 is restricted by the compressive deformation of the elastic body 30. At the time of the end bush impact described above, even when the axial force reaches the axial force α2 due to the reverse input and the elastic body 30 is compressively deformed by an amount corresponding to the length L2, the contact portion 40b and the contact face 5e are apart from each other at least by a length L3 (L3=L1−L2).

Next, the operation of the steering apparatus 1 will be described. When a normal input is applied to the rack shaft 4, compressive deformation of the elastic body 30 in the axial direction by an amount exceeding the length L1 is restricted. On the other hand, when a reverse input is applied to the rack shaft 4, even if the elastic body 30 is compressively deformed, restriction of the compressive deformation as in the case of a normal input is not made.

As illustrated in FIG. 4B, in the case where an end bush impact occurs due to a normal input resulting from the driver's steering operation and thus the duration of a load is relatively long, the compressive deformation of the elastic body 30 is restricted by the contact face 5e (of the projection 5c of the rack housing 5). Thus, at the time of the end bush impact caused by the driver's steering operation, the amount of compressive deformation of the elastic body 30 reaches the length L1 and further compressive deformation is restricted. Therefore, if the driver continues to apply force to maintain the end bush impact in the above-described state, a wobble of the steering wheel 2 is restricted.

On the other hand, as illustrated in FIG. 4C, in the case where an end bush impact occurs due to a reverse input caused, for example, as the steered wheel runs onto a curb and thus the duration of a load is relatively short, the compressive deformation of the elastic body 30 is not restricted by the contact face 5e of the rack housing 5. Thus, at the time of the end bush impact caused, for example, as the steered wheel runs onto the curb, the reverse input is absorbed before the amount of compressive deformation reaches the length L1. As a result, it is possible to restrict the influence of the reverse input on the steering apparatus 1.

In addition, at the time of an end bush impact, first, the end plate 40 receives collision of the ball joint 20, and such an input from the ball joint 20 compressively deforms the elastic body 30 via the end plate 40. In particular, when the elastic body 30 is compressively deformed by an amount corresponding to the length L1 at the time of an end bush impact caused by the driver's steering operation, the contact face 5e of the rack housing 5 receives the end plate 40 to restrict the compressive deformation. In this case, the axial force from the end plate 40 is received by the elastic body 30 and the contact face 5e, and thus the axial force is received by a wider area. Thus, a stress does not concentrate on a limited part in the end plate 40, and the stress is dispersed and uniformized.

In addition, because the elastic body 30 is fixed to the rack housing 5, for example, coming off of the elastic body 30 from housing 5 is restricted after an end bush impact. Thus, it is possible to effectively utilize the contact face 5e, that is, the configuration for restricting the compressive deformation of the elastic body 30.

According to the present embodiment, the following advantageous effects are obtained. 1) At the time of an end bush impact due to a normal input resulting from the driver's steering operation, if the driver continues to apply force to maintain the end bush impact, a wobble of the steering wheel 2 is restricted. As a result, the driver is inhibited from feeling uncomfortable at the time of the end bush impact caused by the steering operation.

2) at the time of an end bush impact due to a reverse input caused, for example, as the steered wheel 11 runs onto a curb, the structure for restricting compressive deformation of the elastic body 30 is not utilized, the steering apparatus 1 is inhibited from being damaged at the time of the end bush impact caused as the steered wheel 11 runs onto the curb.

3) In the present embodiment, the movement of the end plate 40 is restricted at a radially outer position and thus the compressive deformation of the elastic body 30 is restricted. Therefore, it is easy to ensure a wide area of a region of the end plate 40, which is used to restrict the compressive deformation of the elastic body 30.

4) At the time of an end bush impact caused by the driver's steering operation, a stress does not concentrate on a limited part in the end plate 40 and thus the stress is dispersed and uniformized. Thus, even when the end member collides with the end plate 40 at the time of the end bush impact, for example, deformation of the end plate 40 is restricted.

5) Because, for example, leaning of the elastic body 30 at the time of an end bush impact is restricted and thus the configuration for restricting the compressive deformation of the elastic body 30 is effectively utilized, the driver is inhibited from feeling uncomfortable at the time of the end bush impact caused by the driver's steering operation.

Next, a steering apparatus according to a second embodiment of the invention will be described. Note that the main difference between the present embodiment and the first embodiment is only the configuration relating to the elastic body 30 and the end plate 40. Therefore, the same configurations and the same control contents as those in the first embodiment will be denoted by the same reference symbols as those in the first embodiment, and detailed description thereon will be omitted.

Figure 5:
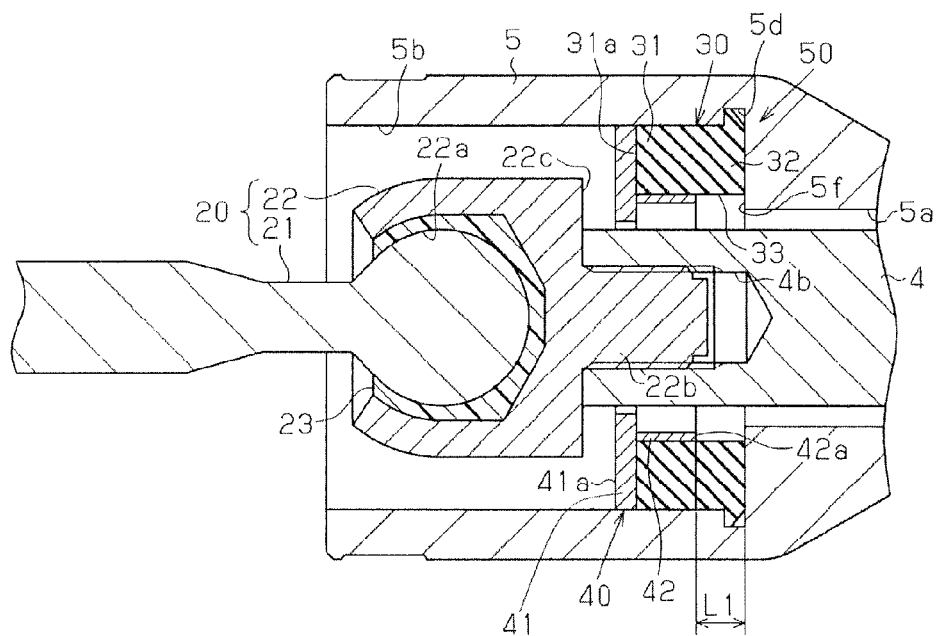
FIG. 5 is a view illustrating the schematic configuration of a shaft end portion of a rack shaft according to a second embodiment of the invention.
Figure 6:
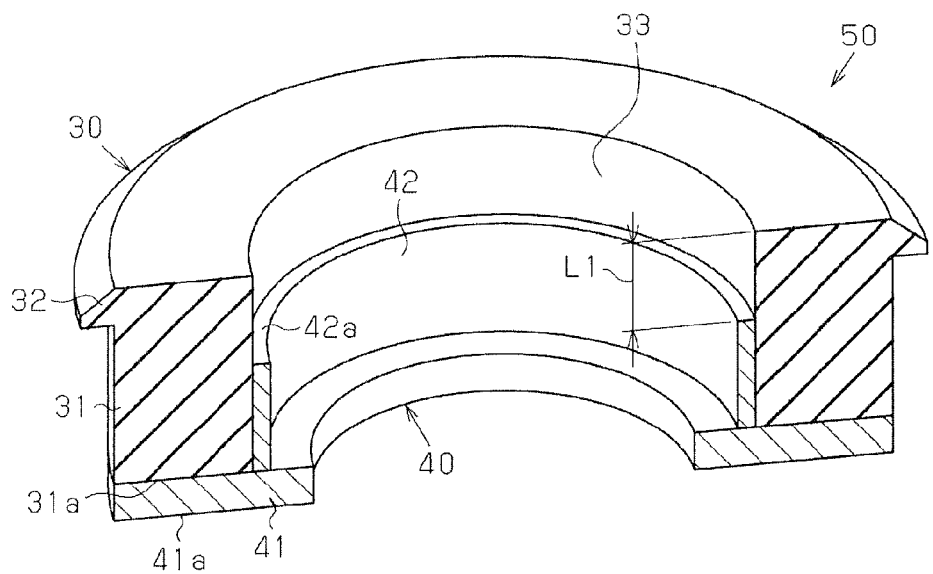
FIG. 6 is a sectional view of an assembly formed by assembling together an elastic body and an end plate in the second embodiment.

As illustrated in FIG. 5 and FIG. 6, the joint housing portion 5b of the rack housing 5 is formed so that the inside diameter is maintained constant in the axial direction, the groove 5d is formed at a part of the joint housing portion 5b so as to extend toward the outside of the rack housing 5, and the inside diameter of the groove 5d is larger than that of the joint housing portion 5b. In addition, a contact face 5f is located between the rack housing portion 5a and the joint housing portion 5b, and is formed due to the difference between the inside diameter of the rack housing portion 5a and the inside diameter of the joint housing portion 5b.

The outside diameter of the body portion 31 of the elastic body 30 in the present embodiment is set slightly smaller than the inside diameter of the joint housing portion 5b of the rack housing 5. In addition, the inside diameter of the body portion 31 is set larger than the outside diameter of the rack shaft 4. That is, an insertion hole 33 having a diameter that is larger than the outside diameter of the rack shaft 4 and smaller than the inside diameter of the rack housing portion 5a of the rack housing 5 is formed in the inside of the body portion 31. In addition, the rack housing portion 5a-side corner of the fitting portion 32 of the elastic body 30 is chamfered, which makes it easier to fit the elastic body 30 to the rack housing 5. Note that a clearance into which the axial force generated by the rack shaft 4 escapes is formed in the groove 5d.

The end plate 40 is fitted in the insertion hole 33 of the elastic body 30. The end plate 40 in the present embodiment includes a disc-shaped plate portion 41 through which the rack shaft 4 is passed, and a cylindrical restricting portion 42. The restricting portion 42 is coaxially fitted to one side of the plate portion 41. Both the plate portion 41 and the restricting portion 42 are made of metal such as iron having a modulus of elasticity higher than that of the elastic body 30. The plate portion 41 and the restricting portion 42 are fitted to the distal end 31a of the elastic body 30 with fixing means, such as an adhesive agent. In the present embodiment, an assembly 50 formed by assembling together the elastic body 30, the plate portion 41 and the restricting portion 42 may be referred to as an impact (input) absorbing member.

The outside diameter of the plate portion 41 is set slightly smaller than the inside diameter of the joint housing portion 5b of the rack housing 5, and the inside diameter of the plate portion 41 is set slightly larger than the outside diameter of the rack shaft 4. That is, a receiving portion 41a to be brought into contact with the end portion 22c of the ball joint 20 at the time of an end bush impact is formed on an end face of the plate portion 41, which faces ball joint 20.

In addition, the outside diameter of the restricting portion 42 is set substantially equal to the inside diameter of the insertion hole 33 of the elastic body 30, and the inside diameter of the restricting portion 42 is set larger than the inside diameter of the rack housing portion 5a of the rack housing 5. That is, a contact portion 42a to be brought into contact with the contact face 5f of the rack housing 5 at the time of an end bush impact is formed on the rack housing portion 5a-side end face of the restricting portion 42.

The axial length of the body portion 31 of the elastic body 30 in the present embodiment is set such that the distance between the contact portion 42a of the restricting portion 42 and the contact face 5f is a length L1 when the elastic body 30 has not undergone compressive deformation. That is, the axial length of the restricting portion 42 of the end plate 40 is set such that the distance between the contact portion 42a of the end plate 40 and the contact face 5f is the length L1 when the elastic body 30 has not undergone compressive deformation.

As described above, the distance between the contact portion 42a of the restricting portion 42 and the contact face 5f is a range in which the elastic body 30 is compressively deformed in the axial direction due to an end bush impact. More specifically, the range in which the elastic body 30 is compressively deformed is set such that the contact portion 42a of the restricting portion 42 does not come into contact with the contact face 5f, that is, the rack housing 5, even if the axial force α2 is generated by a reverse input and the elastic body 30 is compressively deformed. Further, the range in which the elastic body 30 is compressively deformed is set such that the contact portion 42a of the restricting portion 42 comes into contact with the contact face 5f, that is, the rack housing 5, when an axial force equal to or larger than a value β (and smaller than a value α1) is generated due to a normal input and thus the elastic body 30 is compressively deformed.

Thus, at the time of an end bush impact due to a normal input, the end portion 22c is in contact with the receiving portion 41a, and the contact portion 42a and the contact face 5f are in contact with each other in the direction of a reciprocating motion of the rack shaft 4. Thus, movement of the socket 22 and the rack shaft 4 is restricted by the contact face 5f, and reaches the limit of the moving range of the socket 22 and the rack shaft 4. In the present embodiment, the receiving portion 41a of the plate portion 41 or the end plate 40 functions as an end receiving portion.

On the other hand, at the time of an end bush impact due to a reverse input, the end portion 22c and the receiving portion 41a are in contact with each other, and the contact portion 42a of the restricting portion 42 and the contact face 5f are apart from each other. Thus, the moving speed of the socket 22 and the rack shaft 4 is reduced due to the compressive deformation of the elastic body 30, and the movement thereof is stopped ultimately. At the time of this end bush impact, even if the axial force reaches the axial force α2 due to the reverse input and the elastic body 30 is compressively deformed by an amount corresponding to the length L2, the contact portion 42a of the restricting portion 42 and the contact face 5f are apart from each other at least by the length L3 (L1−L2). As described above, according to the present embodiment, the advantageous effects 1), 2), 5) of the first embodiment are obtained.

Next, a steering apparatus according to a third embodiment of the invention will be described. Note that the main difference between the present embodiment and the above-described embodiments is only the configuration relating to the elastic body 30 and the end plate 40. Therefore, the same configurations and the same control contents as those in the above-described embodiments will be denoted by the same reference symbols as those in the above-described embodiments, and detailed description thereon will be omitted.

Figure 7:
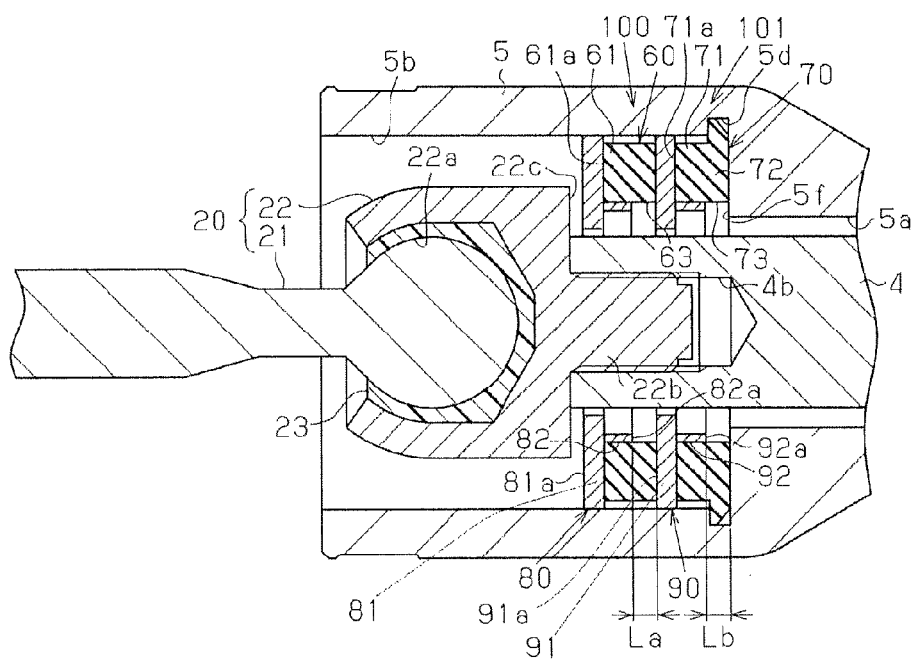
FIG. 7 is a view illustrating the schematic configuration of a shaft end portion of a rack shaft according to a third embodiment of the invention.
Figure 8:
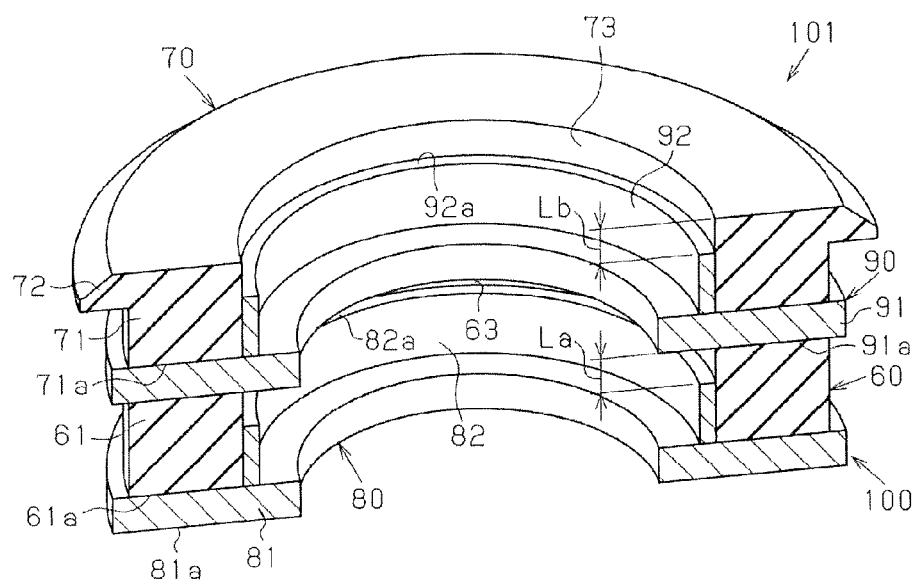
FIG. 8 is a sectional view of an assembly formed by assembling together an elastic body and an end plate in the third embodiment.

As illustrated in FIG. 7 and FIG. 8, a plurality of (two, in the present embodiment) elastic bodies 60, 70 made of resin material, such as rubber, and a plurality of (two, in the present embodiment) end plates 80, 90 made of metal, such as iron having a modulus of elasticity higher than that of the elastic bodies 60, 70 are alternately disposed between the rack housing portion 5a and the ball joint 20. That is, an assembly 100 formed by assembling together the elastic body 60 and the end plate 80, and an assembly 101 formed by assembling together the elastic body 70 and the end plate 90 are disposed next to each other between the rack housing portion 5a and the ball joint 20 in the axial direction. As a result, the metal and the resin material are alternately disposed. A member formed by disposing the assemblies 100, 101 next to each other in the axial direction may be referred to as an impact (input) absorbing member in which the metal and the resin material are alternately disposed. Note that the rack shaft 4 is passed through the elastic bodies 60, 70 and the end plates 80, 90. The elastic bodies 60, 70 are made of the same material, and the end plates 80, 90 are made of the same metal material.

The elastic bodies 60, 70 in the present embodiment have an annular shape, and are provided with body portions 61, 71 of which the outside diameters are maintained constant in the axial direction, respectively. The elastic body 70 disposed on the contact face 5f side, out of the respective elastic bodies 60, 70, has a flange-shaped fitting portion 72. The outside diameter of each of the body portions 61, 71 is set smaller than the inside diameter of the joint housing portion 5b, and the inside diameter of each of the body portions 61, 71 is set larger than the outside diameter of the rack shaft 4, when the elastic bodies 60, 70 have not undergone compressive deformation. That is, insertion holes 63, 73 having a diameter larger than the outside diameter of the rack shaft 4 and smaller than the inside diameter of the rack housing portion 5a are formed in the body portions 61, 71, respectively.

The end plate 80 is fitted in the insertion hole 63, and the end plate 90 is fitted in the insertion hole 73. The end plates 80, 90 of the present embodiment have disc-shaped plate portions 81, 91 through which the rack shaft 4 is passed, and cylindrical restricting portions 82, 92, respectively. The restricting portions 82, 92 are coaxially fitted to one sides of the plate portions 81, 91, respectively. The plate portions 81, 91 and the restricting portions 82, 92 are all made of metal, such as iron having a modulus of elasticity higher than that of the elastic body 30.

The outside diameter of each of the plate portions 81, 91 is set slightly smaller than the inside diameter of the joint housing portion 5b, and the inside diameter of each of the plate portions 81, 91 is set slightly larger than the outside diameter of the rack shaft 4. A receiving portion 81a to be brought into contact with the end portion 22c at the time of an end bush impact is formed on an end face of the plate portion 81, which is located on the ball joint 20 side. A fitting portion 91a to which the elastic body 60 is to be fitted is formed on an end face of the plate portion 91, which is located on the elastic body 60 side.

The plate portion 81 and the restricting portion 82 are fitted to a distal end 61a of the elastic body 60 with fixing means, such as an adhesive agent, whereby the assembly 100 is formed. Similarly, the plate portion 91 and the restricting portion 92 are fitted to a distal end 71a of the elastic body 70 with fixing means, such as an adhesive agent, whereby the assembly 101 is formed. Then, the elastic body 60 is fitted to the fitting portion 91a of the plate portion 91 fitted to the elastic body 70 with fixing means such as an adhesive agent, whereby the assemblies 100, 101 are integrated with each other.

The outside diameter of each of the restricting portions 82, 92 is set substantially equal to the inside diameter of each of the insertion holes 63, 73 of the elastic bodies 60, 70, through which the restricting portions 82, 92 are respectively inserted, and the inside diameter of each of the restricting portions 82, 92 is set larger than the inside diameter of the rack housing portion 5a. That is, a contact portion 92a to be brought into contact with the contact face 5f of the rack housing 5 at the time of an end bush impact is formed on an end face of the restricting portion 92, which is located on the rack housing portion 5a side. A contact portion 82a to be brought into contact with the fitting portion 91a of the plate portion 91 at the time of an end bush impact is formed on an end face of the restricting portion 82, which is located on the rack housing portion 5a side.

The length of the body portion 61 of the elastic body 60 in the axial direction is set such that the distance between the contact portion 82a of the restricting portion 82 and the fitting portion 91a is a length La when the elastic body 60 has not undergone compressive deformation. Similarly, the length of the body portion 71 of the elastic body 70 in the axial direction is set such that the distance between the contact portion 92a of the restricting portion 92 and the contact face 5f is a length Lb when the elastic body 70 has not undergone compressive deformation. In the present embodiment, the length La and the length Lb are equal to each other, and are each set to half (½) the length L1. That is, the length of each of the restricting portions 82, 92 in the axial direction is set such that the sum of the distance between the contact portion 82a of the restricting portion 82 and the fitting portion 91a, and the distance between the contact portion 92a of the restricting portion 92 and the contact face 5f is equal to the length L1, when the elastic bodies 60, 70 have not undergone compressive deformation.

As described above, the distance between the contact portion 82a of the restricting portion 82 and the fitting portion 91a is a range in which the elastic body 60 is compressively deformed in the axial direction due to the end bush impact. Similarly, the distance between the contact portion 92a of the restricting portion 92 and the contact face 5f is a range in which the elastic body 70 is compressively deformed in the axial direction due to the end bush impact.

FIG. 3 illustrates the relationship between the axial force applied to each of the elastic bodies 60, 70 from the rack shaft 4 and the compression deformation length (mm) in the present embodiment. The relationship in the case of a normal input is indicated by an alternate long and short dash line, and that in the case of a reverse input is indicated by a continuous line. At the same axial force, in the present embodiment in which the elastic bodies 60, 70 are made of the same material and the end plates 80, 90 are made of the same material, the compressive deformation amount of each of the elastic bodies 60, 70 is half the compressive deformation amount of the elastic body 30 in the first embodiment.

More specifically, the range in which each of the elastic bodies 60, 70 is compressively deformed is set such that the contact portions 82a, 92a of the end plates 80, 90 do not come into contact with other members, even if the axial force α2 is generated due to a reverse input and the elastic bodies 60, 70 are compressively deformed. That is, the range is set such that the contact portion 82a does not come into contact with the fitting portion 91a and the contact portion 92a does not come into contact with the contact face 5f.

Further, the range in which each of the elastic bodies 60, 70 is compressively deformed is set as a prescribed range in which the contact portions 82a, 92a of the end plates 80, 90 may come into contact with other members, when an axial force equal to or larger than β (and smaller than α1) is generated due to a normal input and the elastic bodies 60, 70 are compressively deformed. That is, the range is set such that the contact portion 82a of the end plate 80 may come into contact with the end plate 90 (fitting portion 91a) and the contact portion 92a of the end plate 90 may come into contact with the rack housing 5 (contact face 5f).

Figure 9A:
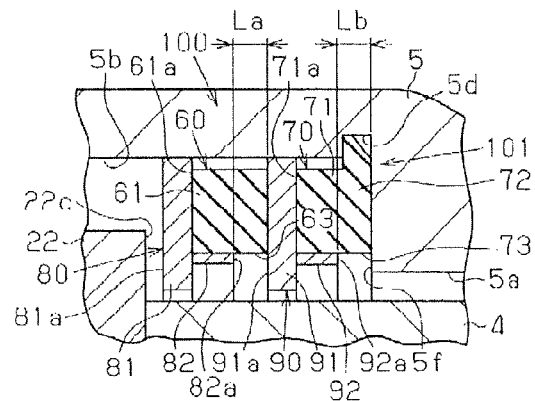
FIG. 9A is a view illustrating the shaft end portion of the rack shaft before occurrence of an end bush impact in the third embodiment.

Next, the shaft end portion of the rack shaft 4 at the time of an end bush impact due to a normal input or a reverse input in the present embodiment will be described. Description will be provided mainly on the elastic bodies 60, 70 and the end plates 80, 90. As illustrated in FIG. 9A, before an end bush impact occurs, the end portion 22c and the receiving portion 81a are apart from each other and the elastic bodies 60, 70 have not undergone compressive deformation. That is, the contact portion 82a and the fitting portion 91a are apart from each other and the distance between the contact portion 82a and the fitting portion 91a is maintained at the length La. In addition, the contact portion 92a and the contact face 5f are apart from each other, and the distance between the contact portion 92a and the contact face 5f is maintained at the length Lb. Thus, the sum of the distance between the contact portion 82a and the fitting portion 91a, and the distance between the contact portion 92a and the contact face 5f is maintained at the length L1.

Figure 9B:
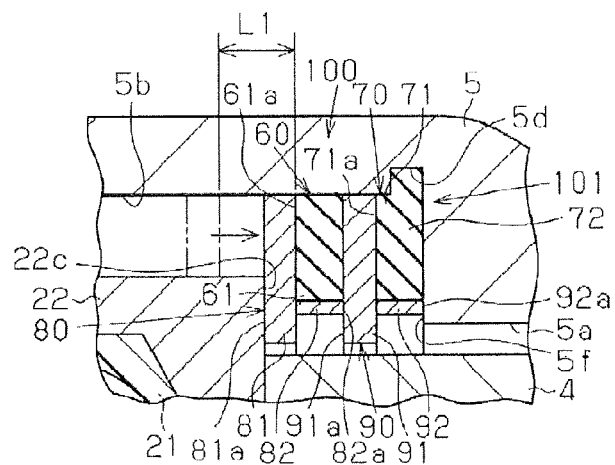
FIG. 9B is a view illustrating the shaft end portion of the rack shaft at the time of an end bush impact due to a normal input in the third embodiment.

Next, as illustrated in FIG. 9B, after the end portion 22c comes into contact with the receiving portion 81a, the elastic bodies 60, 70 are both compressively deformed with an increase in the axial force due to a normal input. When the axial force due to the normal input further increases and reaches the axial force β, the elastic body 60 is compressively deformed by an amount corresponding to the length La, the elastic body 70 is compressively deformed by an amount corresponding to the length Lb, the elastic bodies 60, 70 are compressively deformed by an amount corresponding to the length L1 in total, and thus an end bush impact occurs. Because each of the elastic bodies 60, 70 expands in the radial direction upon reception of the compressive axial force, the distance between each of the elastic bodies 60, 70 and the joint housing portion 5b is shortened.

Figure 9C:
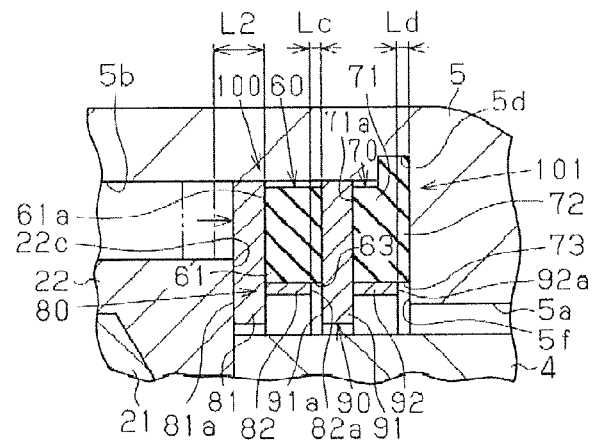
FIG. 9C is a view illustrating the shaft end portion of the rack shaft at the time of an end bush impact due to a reverse input in the third embodiment.

At the time of the end bush impact, the end portion 22c and the receiving portion 81a of the end plate 80 are in contact with each other, and, in addition, the contact portion 82a and the fitting portion 91a of the end plate 90 are in contact with each other and the contact portion 92a and the contact face 5f are in contact with each other in the direction of a reciprocating motion of the rack shaft 4, whereby movement of the end plates 80, 90 is restricted. Thus, in the present embodiment in which movement of the socket 22, that is, movement of the rack shaft 4 is restricted by the contact face 5f, the receiving portion 81a or the end plate 80 having the receiving portion 81a functions as a pressure receiving portion, As illustrated in FIG. 9C, after the end portion 22c collides with the receiving portion 81a, each of the elastic bodies 60, 70 is compressively deformed with an increase in the axial force due to a reverse input. With an increase in the magnitude of the axial force due to the reverse input, the elastic body 60 is compressively deformed in a range corresponding to half the length L2, and the elastic body 70 is compressively deformed in a range corresponding to half the length L2, whereby an end bush impact occurs. Because each of the elastic bodies 60, 70 expands in the radial direction upon reception of the compressive axial force, the distance between each of the elastic bodies 60, 70 and the joint housing portion 5b is shortened.

At the time of the end bush impact, the end portion 22c and the receiving portion 81a are in contact with each other, and, in addition, the contact portion 82a and the fitting portion 91a are in contact with each other, and the contact portion 92a and the contact face 5f are apart from each other. Thus, the moving speed of the socket 22 and the rack shaft 4 is reduced due to the compressive deformation of the elastic bodies 60, 70, and the movement thereof is stopped ultimately. At the time of this end bush impact, even if the axial force reaches the axial force α2 due to the reverse input and each of the elastic bodies 60, 70 is compressively deformed by an amount corresponding to half the length L2, the contact portion 82a and the fitting portion 91a are apart from each other at least by the length Lc (=La−L2/2), and the contact portion 92a and the contact face 5f are apart from each other at least by the length Ld (=Lb−L2/2).

Next, the operation of the steering apparatus 1 according to the present embodiment will be described. Generally, after a certain amount of compressive deformation occurs, an elastic body gradually becomes hard to compress, and exhibits a tendency that the absorption rate with respect to an input load becomes low and the input load required for compressive deformation becomes large. On the other hand, when the certain amount of compressive deformation has not occur, the elastic body exhibits a tendency that the absorption rate with respect to an input load is easily ensured and the input load required for compressive deformation becomes small.

When the assemblies 100, 101 are disposed next to each other in the axial direction as in the present embodiment, the axial force generated by the rack shaft 4 is received by the compressive deformation of both the respective elastic bodies 60, 70, and thus the absorption rate with respect to an input load is easily ensured by the elastic bodies 60, 70. Specifically, in the present embodiment, when the elastic bodies 60, 70 are compressively deformed by an amount corresponding to the length L1 in total, each of the elastic bodies 60, 70 is compressively deformed only by an amount corresponding to half the length L1, and a region is used where compressive deformation of the elastic body is smaller than that in a case where one set of assembly is provided.

As described above, according to the present embodiment, the following advantageous effects are obtained in addition to the advantageous effects 1), 2), 5) obtained in the first embodiment.

6) Providing the assemblies 100, 101 next to each other in the axial direction makes it possible to more easily ensure the absorption rate with respect to an input load than in a case where one set of assembly is provided. When the elastic bodies 60, 70 are compressively deformed by an amount corresponding to the length L1 in total, each of the elastic bodies 60, 70 is compressively deformed only by an amount corresponding to half the length L1, and a region is used where compressive deformation of the elastic body is smaller and the absorption rate with respect to an input load is more easily ensured than in the case where one set of assembly is provided.

7) At the time of an end bush impact caused by the driver's steering operation, especially the start of the compression of each of the elastic bodies 60, 70 is used by providing the assemblies 100, 101 next to each other in the axial direction. Thus, a range where an input required for compressive deformation tends to be small is easily applied. Thus, a force required when the driver maintains the end bush impact state is easily reduced. As a result, there is provided the steering apparatus 1 that makes it possible to easily maintain the end bush impact state irrespective of the driver.

Each of the above-described embodiments may be modified as follows. If the elastic body is fixed to the rack housing 5, the groove 5d need not be formed. In this case, for example, the elastic body 30 may be fixed to the rack housing 5 with an adhesive agent. The elastic body may be fixed to the rack housing 5 by forming a portion corresponding to the fitting portion 32 in the rack housing 5 and a portion corresponding to the groove 5d in the elastic body.

A plurality of the grooves 5d may be formed in the rack housing 5 in a non-continuous manner. For example, a plurality of (for example, four) the grooves 5d may be formed at equal intervals in the circumferential direction of the projection 5c. The length L1, which is the limit of the compressive deformation amount of the elastic body 30 or the total compressive deformation amount of the elastic bodies 60, 70, may be changed within a range larger than the compressive deformation amount L2 with respect to the axial force α2 due to the reverse input. In the combination of a motion conversion mechanism and a steering force assist device of a steering mechanism, the length L1, which is the limit of the compressive deformation amount of the elastic body 30 or the total compressive deformation amount of the elastic bodies 60, 70 may be set, under the conditions that the minimum axial force, at which abnormality such as jumping occurs at the weakest portion among the various coupling portions in each of the mechanism and the device, is set as α2, and the length corresponding to α2 is set as L2.

In the first embodiment, a plurality of the projections 5c may be formed on the rack housing 5 in a non-continuous manner. For example, a plurality of the projections 5c, for example, four projections 5c may be formed at equal intervals in the circumferential direction of the joint housing portion 5b. In the first embodiment, the rack housing 5 need not have the function as the restricting portion. For example, the projection 5c need not be formed. In this case, the cylindrical restricting portion similar to the restricting portion described in the second embodiment may be formed so as to extend toward the elastic body 30 from the periphery of the end plate 40. In this configuration as well as in the second embodiment, the wall face formed due to the difference in inside diameter between the rack housing portion 5a and the joint housing portion 5b functions as the contact face.

In the second and third embodiments, a plurality of the elastic bodies may be formed on the plate portion in a non-continuous manner. For example, a plurality of (for example, four) elastic bodies 30 may be formed in a circular pattern at regular intervals in the circumferential direction of the plate portion 41. In the second and third embodiments, the plate portion may be omitted. In addition, the plate portion and the restricting portion may be a single-piece member. In the third embodiment, assemblies may be added, and three or more assemblies may be disposed next to each other in the axial direction.

Figure 10:
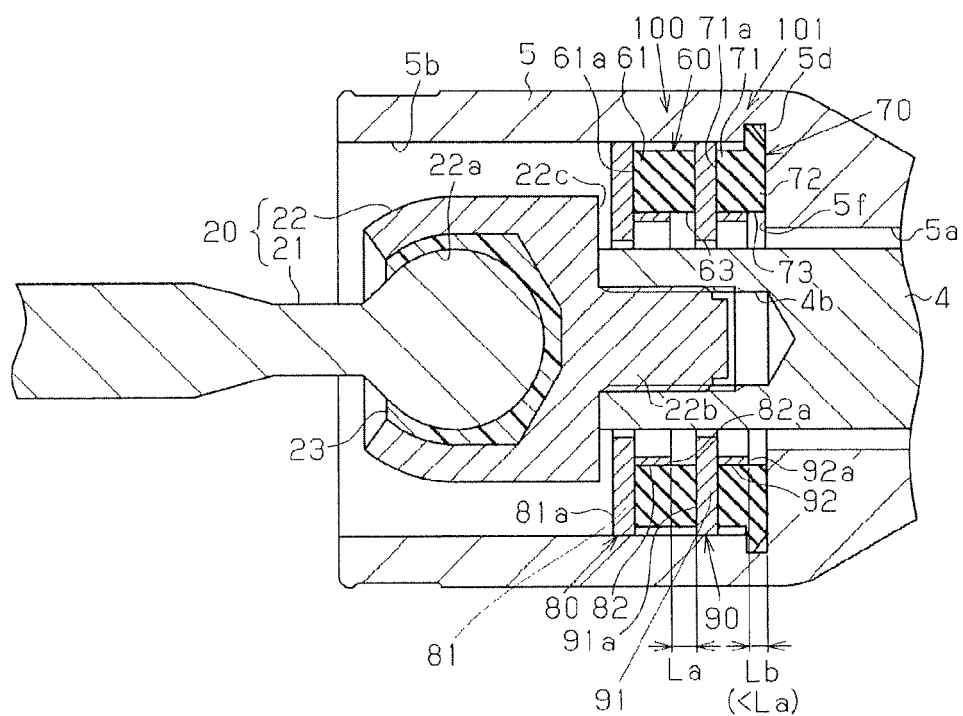
FIG. 10 is a view illustrating the schematic configuration of a shaft end portion of a rack shaft according to another embodiment of the invention.

In the third embodiment, as illustrated in FIG. 10, the axial lengths of the elastic bodies 60, 70 of the assemblies 100, 101 may be different from each other. In this case, the axial length of the elastic body 60 closer to the ball joint 20 is preferably set longer than that of the elastic body 70. In the third embodiment, the materials of the elastic bodies 60, 70 may be different from each other. For example, the material of the elastic body 60 closer to the ball joint 20 may be a material having a modulus of elasticity higher than that of the elastic body 70. In this case, the axial lengths of the elastic bodies 60, 70 are set equal to each other. However, the configuration in this case is equivalent to the configuration illustrated in FIG. 10.

The elastic body may be an elastic member having no viscosity, such as a coil spring. The steering apparatus 1 may be another kind of electric power steering apparatus, may be a hydraulic power steering apparatus, or may be a just steering apparatus provided with no power steering mechanism. The elastic body may be fixed to the end portion 22c of the socket 22. In addition, the elastic body may be allowed to slide along the rack shaft 4 instead of being fixed.

In each of the embodiments, if there is provided the configuration of the restricting portion for restricting compressive deformation of the elastic body at the time of an end bush impact regardless of input types such as a normal input and a reverse input, at least the advantageous effect 1) is obtained. That is, at least the advantageous effect 1) is obtained by a technical idea, that is, a steering apparatus including: a steered shaft that changes an orientation of steered wheels by making a linear motion in a housing in response to rotation of a steering shaft; an end member that is fitted to an end portion of the steered shaft, and that comes into contact with or moves away from the housing in response to movement of the steered shaft; an elastic body disposed between the housing and the end member; and a restricting portion that restricts compressive deformation of the elastic body beyond a limit of a prescribed range, when the elastic body is compressively deformed in a direction of the linear motion due to collision of the end member with the elastic body With this configuration, when the elastic body is compressively deformed in the direction of a linear motion as the end member collides with the elastic body, compressive deformation of the elastic body beyond the limit of the prescribed range is restricted. For example, a collision of the end member with the elastic body caused by the driver's operation of the steering wheel is assumed to be a collision of the end member with the elastic body. Thus, at the time of an end bush impact caused by the driver's operation of the steering wheel, the compressive deformation of the elastic body is restricted by the restricting portion. Thus, the amount of compressive deformation of the elastic body reaches the limit of the prescribed range and further compressive deformation is restricted. Therefore, if the driver continues to apply force to maintain the end bush impact in the above-described state, a wobble of the steering wheel is restricted. As a result, it is possible to inhibit the driver from feeling uncomfortable at the time of an end bush impact due to the operation of the steering wheel.

What is claimed is:
1. A steering apparatus comprising:
   a steered shaft that changes an orientation of steered wheels by making a linear motion in a housing in response to rotation of a steering shaft;
   an end member that is fitted to an end portion of the steered shaft, and that comes into contact with or moves away from the housing in response to movement of the steered shaft;
   an elastic body disposed between the housing and the end member; and
   a restricting portion that restricts compressive deformation of the elastic body beyond a limit of a prescribed range, when the elastic body is compressively deformed in a direction of the linear motion of the steered shaft due to collision of the end member with the elastic body, wherein
   the restricting portion restricts the compressive deformation beyond the limit of the prescribed range when a first input is applied to the steered shaft, and the prescribed range is set larger than a range in which the elastic body is compressively deformed when a second input that is shorter in duration than the first input is applied to the steered shaft.

2. The steering apparatus according to claim 1, wherein:
the restricting portion is disposed radially inward of the elastic body; and
the restricting portion restricts the compressive deformation beyond the limit of the prescribed range by restricting movement of the end member when the end member collides with the elastic body.

3. The steering apparatus according to claim 2, further comprising an assembly formed by assembling together the elastic body and the restricting portion, wherein a plurality of the assemblies is stacked in an axial direction of the steered shaft so as to be disposed between the housing and the end member.

4. The steering apparatus according to claim 3, wherein a groove in which the elastic body is fixedly fitted is formed in an inner periphery of the housing.

5. The steering apparatus according to claim 2, wherein a groove in which the elastic body is fixedly fitted is formed in an inner periphery of the housing.

6. The steering apparatus according to claim 1, wherein:
the restricting portion is disposed radially outward of the elastic body; and
the restricting portion restricts the compressive deformation beyond the limit of the prescribed range by restricting movement of the end member when the end member collides with the elastic body.

7. The steering apparatus according to claim 6, wherein:
an end receiving portion is fitted to the elastic body so as to face the end member, the end receiving portion having a modulus of elasticity higher than that of the elastic body, and having an outside diameter larger than that of the elastic body;
the restricting portion includes a projection formed on an inner periphery of the housing; and
the projection has a contact face with which the end receiving portion can come into contact when the compressive deformation reaches the limit of the prescribed range.

8. The steering apparatus according to claim 7, wherein a groove in which the elastic body is fixedly fitted is formed in an inner periphery of the housing.

9. The steering apparatus according to claim 6, wherein a groove in which the elastic body is fixedly fitted is formed in an inner periphery of the housing.

10. The steering apparatus according to claim 1, wherein a groove in which the elastic body is fixedly fitted is formed in an inner periphery of the housing.

* * * * *